(12) United States Patent
Sultan et al.

(10) Patent No.: US 11,313,713 B2
(45) Date of Patent: Apr. 26, 2022

(54) MAGNETOSTRICTIVE TRANSMITTER

(71) Applicant: Clark-Reliance Corporation, Strongsville, OH (US)

(72) Inventors: Syed Sultan, Brunswick, OH (US); Steven R. McGuigan, Richfield, OH (US); Dennis M. Barrett, Columbia Station, OH (US)

(73) Assignee: Clark Reliance LLC, Strongsville, OH (US)

( * ) Notice: Subject to any disclaimer, the term of this patent is extended or adjusted under 35 U.S.C. 154(b) by 117 days.

(21) Appl. No.: 16/918,455

(22) Filed: Jul. 1, 2020

(65) Prior Publication Data
US 2021/0255026 A1 Aug. 19, 2021

Related U.S. Application Data

(60) Provisional application No. 62/978,599, filed on Feb. 19, 2020.

(51) Int. Cl.
| | | |
|---|---|---|
| *G01F 23/72* | (2006.01) | |
| *G01F 23/68* | (2006.01) | |
| *G01F 23/40* | (2006.01) | |
| *G01F 23/2962* | (2022.01) | |

(52) U.S. Cl.
CPC .......... *G01F 23/72* (2013.01); *G01F 23/2963* (2013.01); *G01F 23/40* (2013.01); *G01F 23/68* (2013.01)

(58) Field of Classification Search
CPC .................................................. G01F 23/2963
See application file for complete search history.

(56) References Cited

U.S. PATENT DOCUMENTS

| | | |
|---|---|---|
| 4,284,904 A | 8/1981 | Tetro |
| 4,839,590 A | 7/1989 | Koski et al. |
| 4,939,457 A | 7/1990 | Tellerman |
| 4,943,773 A | 7/1990 | Koski et al. |
| 5,017,867 A | 5/1991 | Dumais et al. |
| 5,070,485 A | 12/1991 | Nyce |
| 5,076,100 A | 12/1991 | Hunter et al. |
| 5,136,884 A | 8/1992 | Lovett |
| 5,156,047 A | 10/1992 | Tuma et al. |
| 5,196,791 A | 3/1993 | Dumais |
| 5,253,521 A | 10/1993 | Abramovich et al. |

(Continued)

OTHER PUBLICATIONS

Author unknown, Clark-Reliance Corporation—Bulletin M100.23—Magnicator II Magnetostrictive Transmitter, this Bulletin is believed to have been publicly available at least as early as Aug. 2013 (2 pages).

(Continued)

*Primary Examiner* — Paul M. West
*Assistant Examiner* — Mark A Shabman
(74) *Attorney, Agent, or Firm* — Calfee, Halter & Griswold LLP

(57) ABSTRACT

The present invention provides a sensor assembly for a magnetostrictive transmitter. The sensor assembly includes a holder, a substrate, a piezoelectric crystal, and a magnetostrictive wire. The piezoelectric crystal includes an inner surface. The piezoelectric crystal further includes a groove extending in the inner surface. A portion of the magnetostrictive wire is operable to be receive in the groove in the inner surface of the piezoelectric crystal.

21 Claims, 11 Drawing Sheets

(56) References Cited

U.S. PATENT DOCUMENTS

| | | | |
|---|---|---|---|
| 5,473,245 A * | 12/1995 | Silvus, Jr | G01B 7/02 |
| | | | 310/333 |
| 5,640,880 A | 6/1997 | Mulrooney et al. | |
| 5,804,961 A | 9/1998 | Castillo et al. | |
| 5,821,743 A | 10/1998 | Page, Jr. et al. | |
| 5,848,549 A | 12/1998 | Nyce et al. | |
| 5,929,763 A | 7/1999 | Koski | |
| 5,986,449 A | 11/1999 | Koski | |
| 6,167,756 B1 | 1/2001 | Everson, Jr. et al. | |
| 6,205,859 B1 | 3/2001 | Kwun et al. | |
| 6,295,677 B1 | 10/2001 | Kwun et al. | |
| 6,356,071 B1 | 3/2002 | Koski et al. | |
| 6,418,787 B1 | 7/2002 | Eck | |
| 6,456,064 B1 | 9/2002 | Dore et al. | |
| 6,919,779 B2 | 7/2005 | Raphalovitz et al. | |
| 6,923,057 B2 | 8/2005 | Sabatino | |
| 7,019,520 B2 | 3/2006 | Kwun et al. | |
| 7,466,124 B2 | 12/2008 | Janitch et al. | |
| 7,610,806 B2 | 11/2009 | Skinner | |
| 8,218,396 B2 | 7/2012 | Holcomb et al. | |
| 8,402,882 B2 | 3/2013 | Hopper | |
| 8,776,617 B2 | 7/2014 | Durham et al. | |
| 8,978,464 B2 | 3/2015 | Prinstil | |
| 9,074,860 B2 | 7/2015 | Pattee et al. | |
| 9,581,485 B2 | 2/2017 | Haynes et al. | |
| 9,677,927 B2 | 6/2017 | Wu | |
| 10,048,291 B2 | 8/2018 | Fauveau | |
| 10,288,469 B2 | 5/2019 | Demin | |
| 2005/0241391 A1 | 11/2005 | Kull | |
| 2007/0169549 A1 | 7/2007 | Kwun et al. | |
| 2008/0061772 A1 | 3/2008 | Janitch et al. | |
| 2009/0031799 A1 | 2/2009 | Benway | |
| 2013/0106411 A1 | 5/2013 | Chen et al. | |
| 2014/0232375 A1 * | 8/2014 | Fauveau | G01R 3/00 |
| | | | 324/109 |
| 2014/0326038 A1 | 11/2014 | Fauveau | |
| 2016/0025547 A1 * | 1/2016 | Wu | G01F 23/2963 |
| | | | 73/314 |
| 2021/0255026 A1 * | 8/2021 | Sultan | G01F 23/72 |

OTHER PUBLICATIONS

Author unknown, Clark-Reliance Corporation—Bulletin M500.31—MTII4200 level Transmitter—Installation, Operation & Maintenance Instructions, this Bulletin is believed to have been publicly available at least as early as Jan. 26, 2012 (7 pages).

Author unknown, Clark-Reliance Corporation—Magnicator II Magnetic Liquid Level Indication Products, this document is believed to have been publicly available at least as early as 2008 (8 pages).

Author unknown, ABB Inc.—Data sheet, DS/AT200-EN Rev. U—AT200 Magnetostrictive Level Transmitter K-TEK Products, this Data sheet is believed to have been publicly available at least as early as Aug. 2013 (4 pages).

Author unknown, Magnetrol—Bulletin No. BE 46-148.3—Jupiter 200 Magnetostrictive Level Transmitter, this Bulletin is believed to have been publicly available at least as early as Aug. 2015 (16 pages).

Author unknown, Emerson Process Management—Product data information 00803-0100-6156 Rev AC—Magtech Magnetic Level Indicators, this Product data information is believed to have been publicly available at least as early as Sep. 2013 (12 pages).

Author unknown, MTS Systems Corporation—Document Part No. 550720 Revision K (EN)—Level Plus Magnetostrictive Liquid-Level Transmitters with Temposonics Technology—Operation and Installation Manual—M-Series Model MR Analog Transmitter, this Document is believed to have been publicly available at least as early as Feb. 2016 (84 pages).

International Search Report for International App. No. PCT/US2021/18090 dated Apr. 29, 2021 (2 pages).

Written Opinion of the International Searching Authority for International App. No. PCT/US2021/18090 dated Apr. 29, 2021 (6 pages).

* cited by examiner

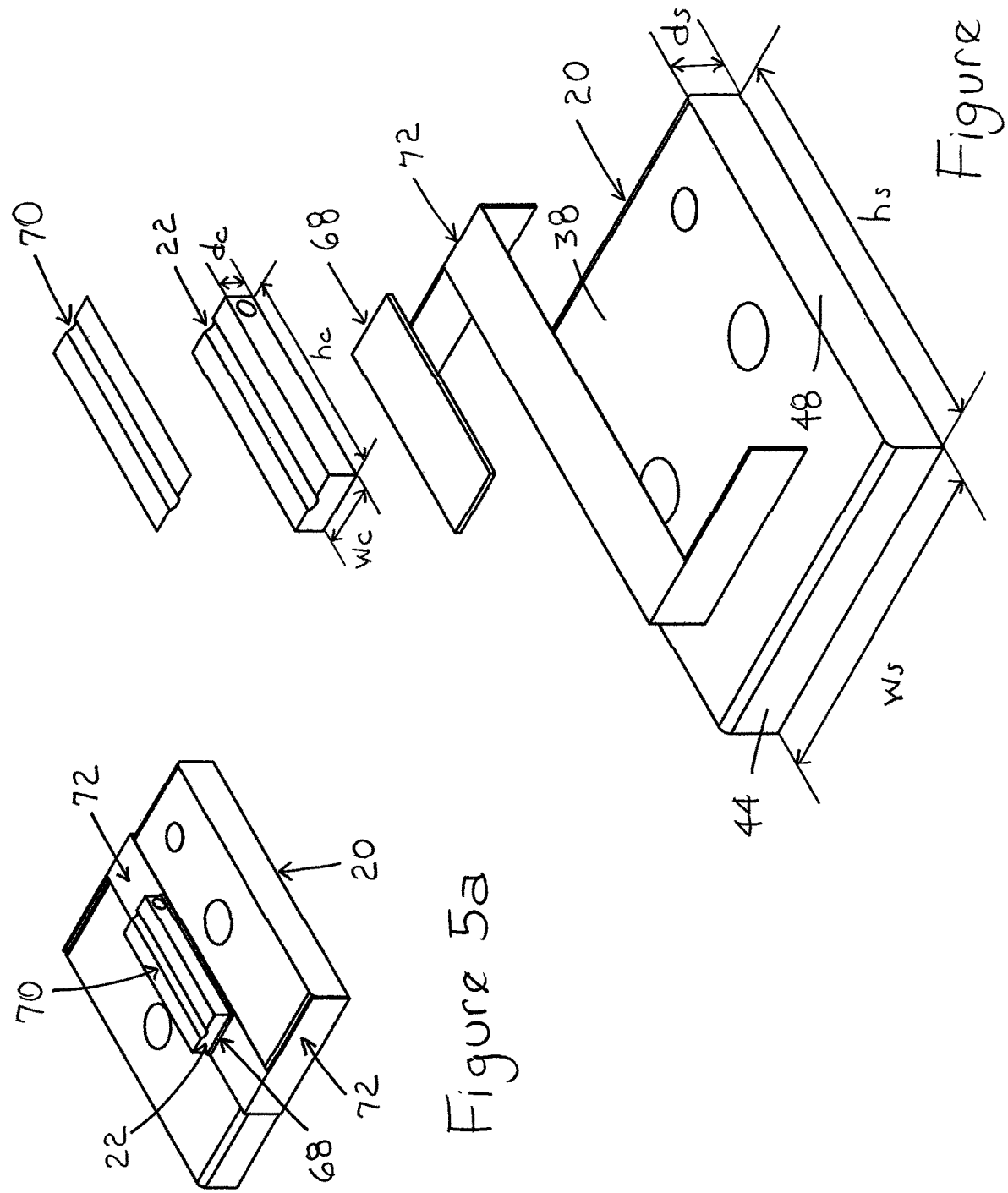

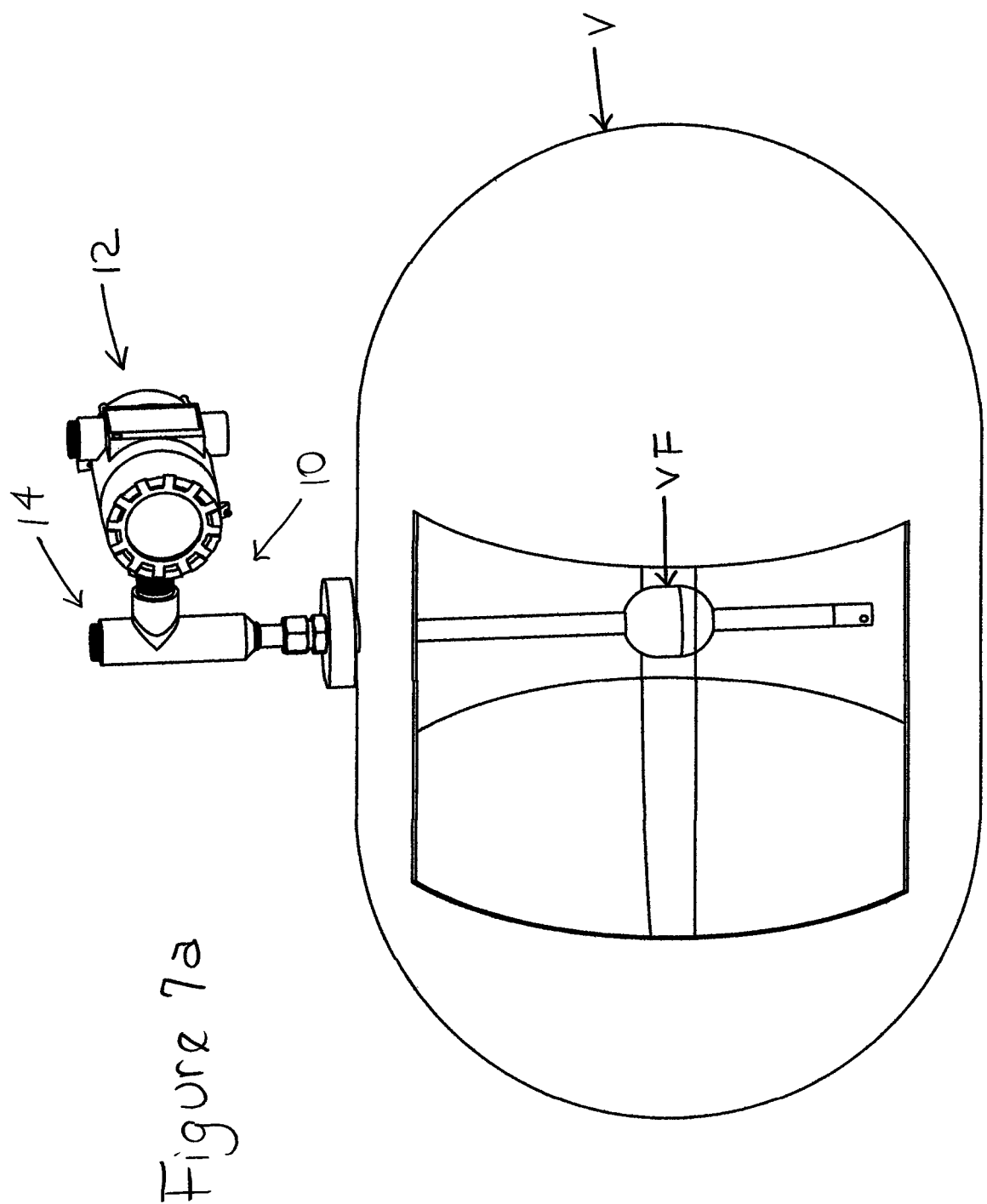

MAGNETOSTRICTIVE TRANSMITTER

CROSS-REFERENCE TO RELATED APPLICATION

This application claims the benefit of U.S. Provisional Application No. 62/978,599, filed Feb. 19, 2020, the entire disclosure of which is hereby incorporated by reference.

FIELD

The present invention relates generally to a magnetostrictive transmitter, and, more particularly, to a sensor assembly for a magnetostrictive transmitter with a piezoelectric crystal including a groove for receiving a magnetostrictive wire.

BACKGROUND

Magnetostrictive transmitters are known. Known magnetostrictive transmitters include a piezoelectric crystal. Known magnetostrictive transmitters also include a magnetostrictive wire. Difficulties can arise in the piezoelectric crystal sensing movement of the magnetostrictive wire.

SUMMARY

The present invention provides a sensor assembly for a magnetostrictive transmitter.

In an exemplary embodiment, the sensor assembly for a magnetostrictive transmitter comprises a holder, a substrate, a piezoelectric crystal, and a magnetostrictive wire. The holder is formed from a non-conductive material. The holder includes an inner surface and an outer surface. The holder further includes an upper surface and a lower surface. The substrate is formed from a non-conductive material. The substrate includes an inner surface and an outer surface. The substrate further includes an upper surface and a lower surface. The substrate is operable to be received in the holder with the outer surface of the substrate opposing the inner surface of the holder. The piezoelectric crystal includes an inner surface and an outer surface. The piezoelectric crystal further includes an upper surface and a lower surface. The piezoelectric crystal further includes a groove extending in the inner surface from the upper surface through the lower surface. The piezoelectric crystal is operable to be mounted to the substrate with the outer surface of the piezoelectric crystal opposing the inner surface of the substrate. The magnetostrictive wire includes an upper end and a lower end. A portion of the magnetostrictive wire is operable to be received in the groove in the inner surface of the piezoelectric crystal.

In an exemplary embodiment, the sensor assembly for a magnetostrictive transmitter comprises a holder, a pair of substrates, a pair of piezoelectric crystals, and a magnetostrictive wire. The holder is formed from a non-conductive material. The holder includes an inner surface and an outer surface. The holder further includes an upper surface and a lower surface. Each substrate is formed from a non-conductive material. Each substrate includes an inner surface and an outer surface. Each substrate further includes an upper surface and a lower surface. Each substrate is operable to be received in the holder with the outer surface of each substrate opposing the inner surface of the holder and with the inner surface of one substrate opposing the inner surface of the other substrate. Each piezoelectric crystal includes an inner surface and an outer surface. Each piezoelectric crystal further includes an upper surface and a lower surface. Each piezoelectric crystal further includes a groove extending in the inner surface from the upper surface through the lower surface. Each piezoelectric crystal is operable to be mounted to one substrate with the outer surface of each piezoelectric crystal opposing the inner surface of one substrate and with the inner surface of one piezoelectric crystal opposing the inner surface of the other piezoelectric crystal. The magnetostrictive wire includes an upper end and a lower end. A portion of the magnetostrictive wire is operable to be received in the groove in the inner surface of each piezoelectric crystal.

In an exemplary embodiment, the sensor assembly for a magnetostrictive transmitter comprises a holder, a substrate, a piezoelectric crystal, and a magnetostrictive wire. The holder is formed from a non-conductive material. The holder includes an inner surface and an outer surface. The holder further includes an upper surface and a lower surface. The substrate is formed from a non-conductive material. The substrate includes an inner surface and an outer surface. The substrate further includes an upper surface and a lower surface. The substrate is operable to be received in the holder with the outer surface of the substrate opposing the inner surface of the holder. The piezoelectric crystal includes an inner surface and an outer surface. The piezoelectric crystal further includes an upper surface and a lower surface. The piezoelectric crystal further includes a groove extending in the inner surface from the upper surface through the lower surface. The piezoelectric crystal is operable to be mounted to the substrate with the outer surface of the piezoelectric crystal opposing the inner surface of the substrate. The magnetostrictive wire includes an upper end and a lower end. A portion of the magnetostrictive wire is operable to be received in the groove in the inner surface of the piezoelectric crystal. The portion of the magnetostrictive wire is in contact with the groove in the inner surface of the piezoelectric crystal.

BRIEF DESCRIPTION OF THE DRAWINGS

—FIG. 1a is a perspective view, FIG. 1b is a partial cross-sectional perspective view taken along the line 1b-1b in FIG. 1a, including a sensor assembly in the sensor housing, and FIG. 1c is a detailed view of the section 1c in FIG. 1b, including components of the sensor assembly in the sensor housing;

-FIG. 3a is a partial front elevational view, FIG. 3b is a cross-sectional view taken along the line 3b-3b in FIG. 3a, and FIG. 3c is a detailed view of the section 3c in FIG. 3b;

—FIG. 4a is a front elevational view, FIG. 4b is a cross-sectional view taken along the line 4b-4b in FIG. 4a, and FIG. 4c is a partially exploded perspective view;

FIGS. 5a-5b are views of components of the sensor assembly of the magnetostrictive transmitter of FIGS. 1a-1c, including the substrate, the conductive strip, the conductive adhesive, the piezoelectric crystal, and the conductive plating—FIG. 5a is a perspective view, and FIG. 5b is an exploded perspective view;

—FIG. 6a is a top plan view, FIG. 6b is a cross-sectional view taken along the line 6b-6b in FIG. 6a, and FIG. 6c is an exploded perspective view; and FIGS. 7a-7b are views of the magnetostrictive transmitter of FIGS. 1a-1c installed in a process —FIG. 7a is a perspective view of the magnetostrictive transmitter connected to a vessel, and FIG. 7b is a perspective view of the magnetostrictive transmitter connected to a gage.

DETAILED DESCRIPTION

Figure 1A:
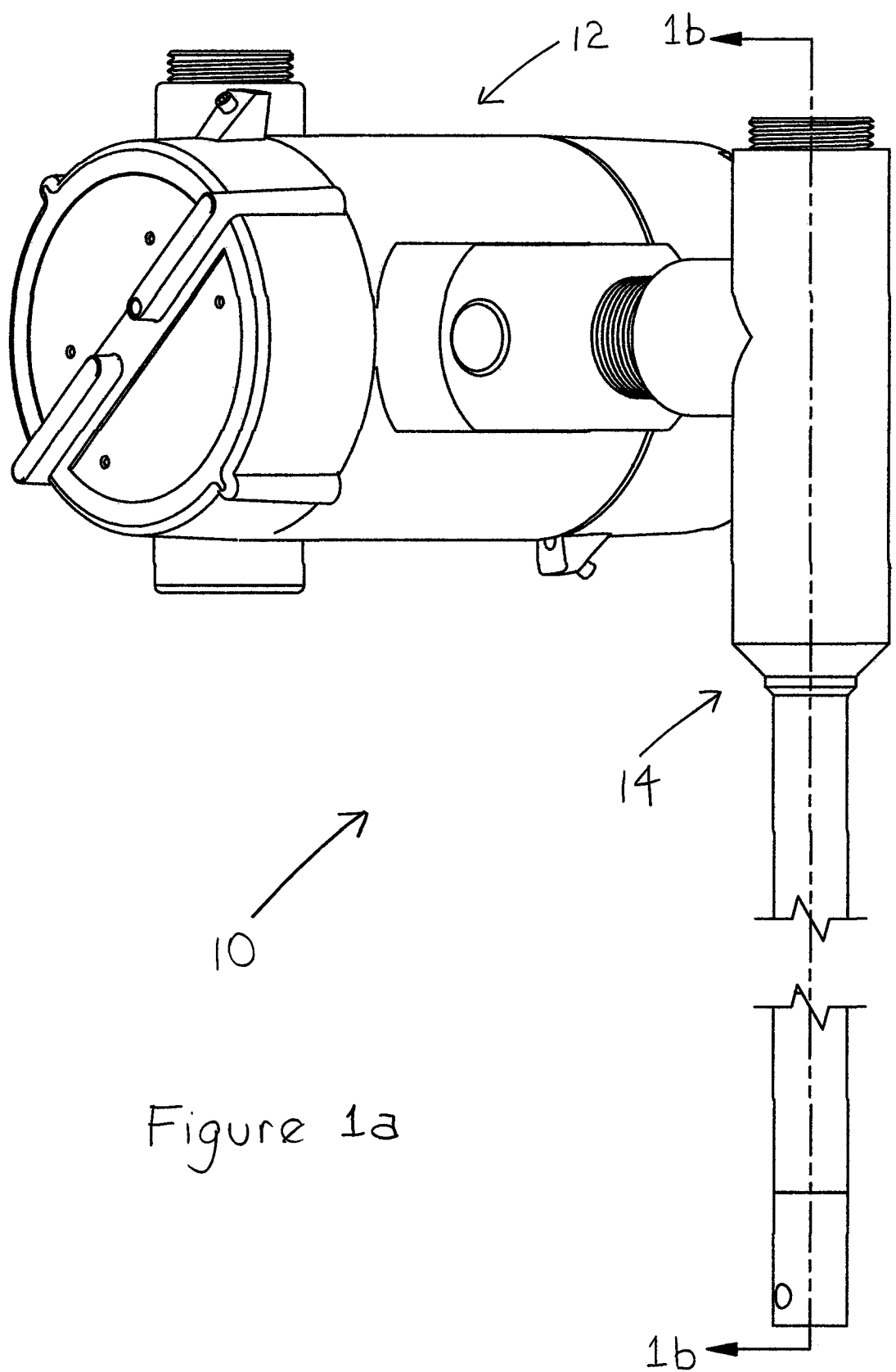
FIGS. 1a-1c are views of a magnetostrictive transmitter according to an exemplary embodiment of the present invention, including an electronics housing and a sensor housing
Figure 1B:
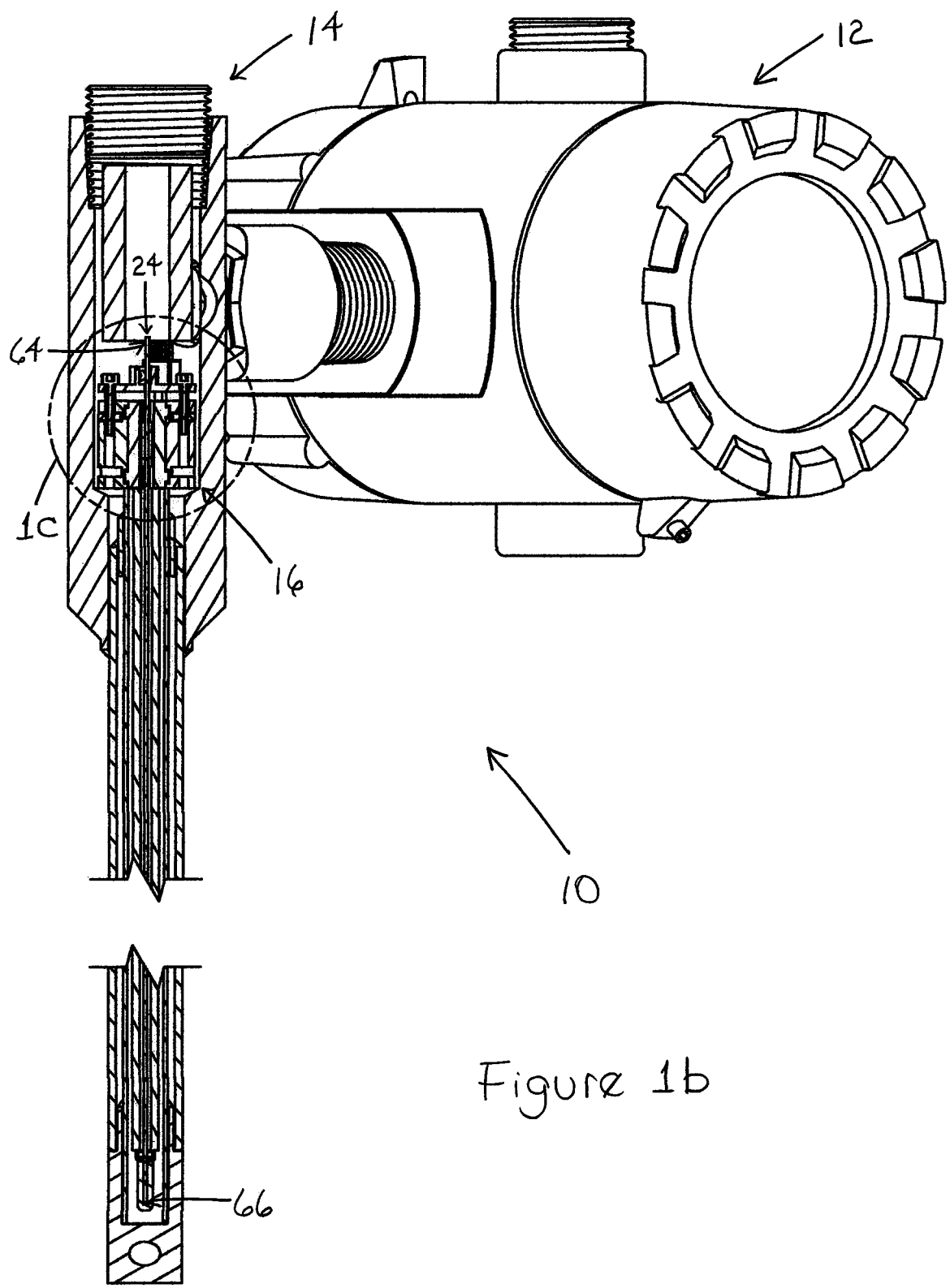
Figure 1C:
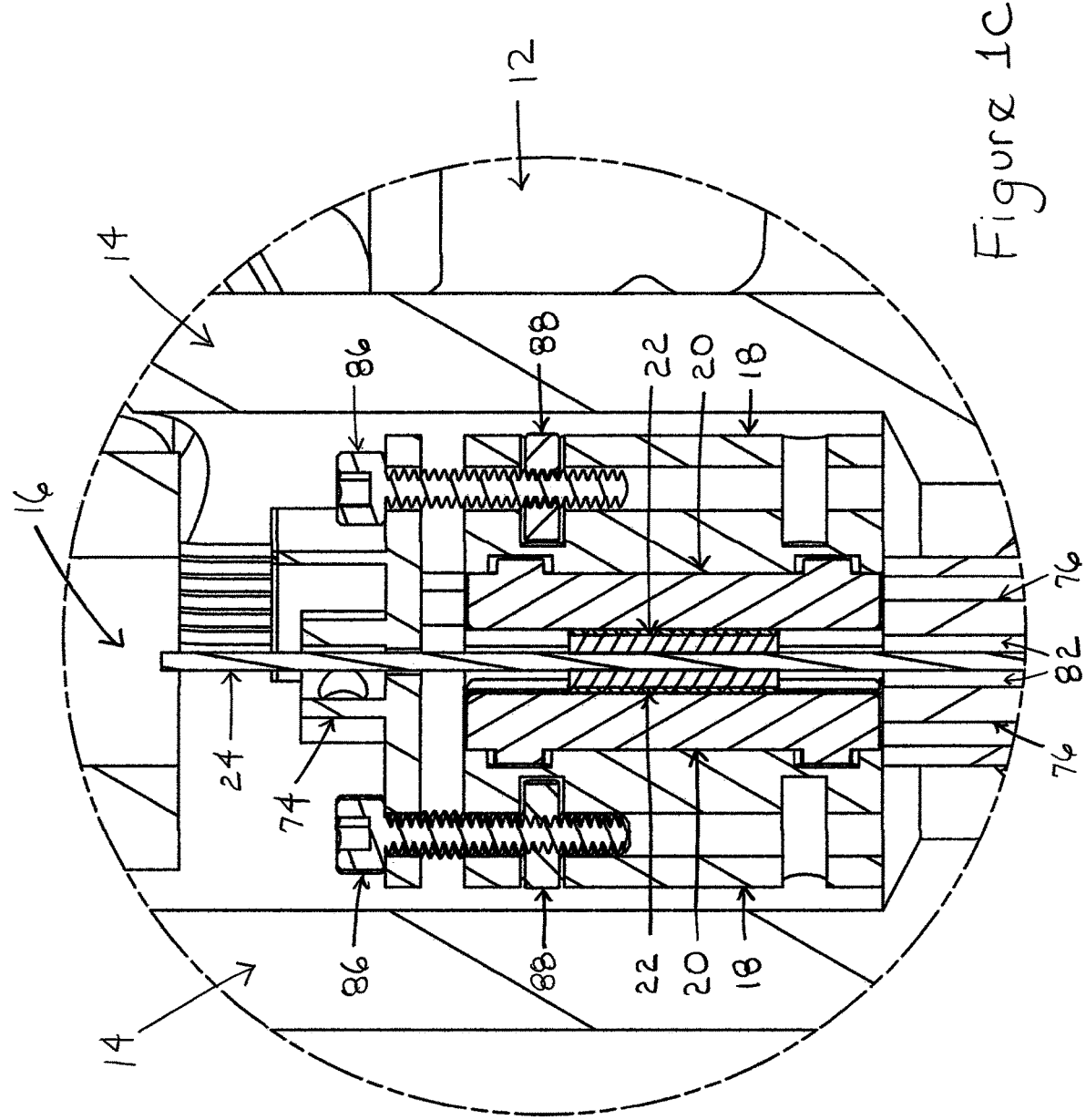
Figure 2:
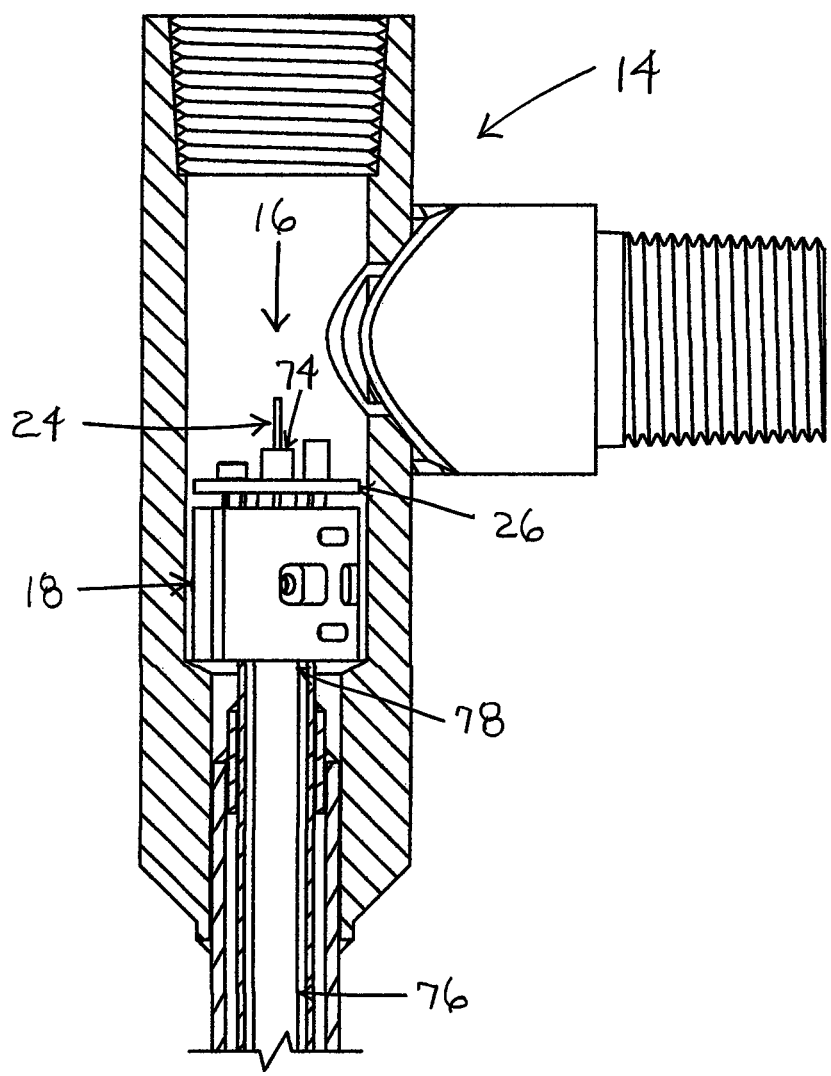
FIG. 2 is a partial cross-sectional view of the sensor assembly in the sensor housing of the magnetostrictive transmitter of FIGS. 1a-1c.
Figure 3B:
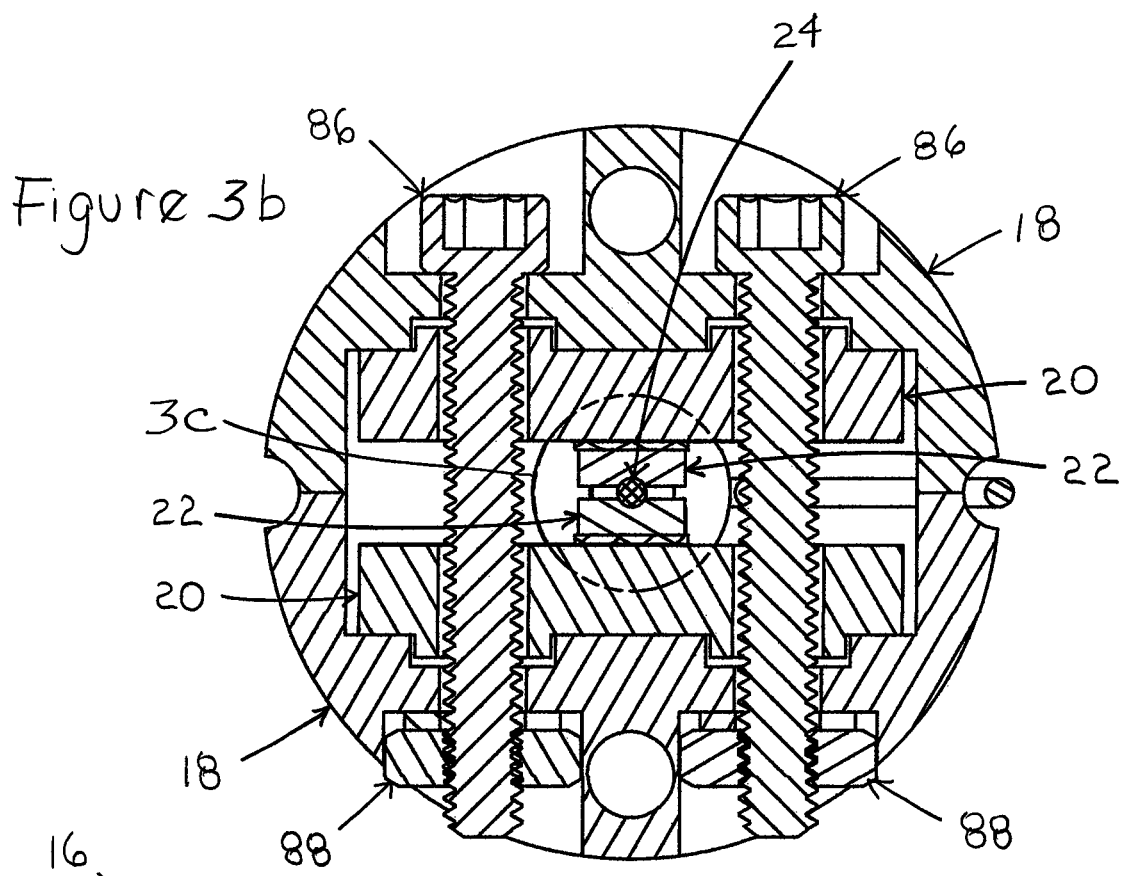
FIGS. 3a-3c are views of the sensor assembly of the magnetostrictive transmitter of FIGS. 1a-1c
Figure 3A:
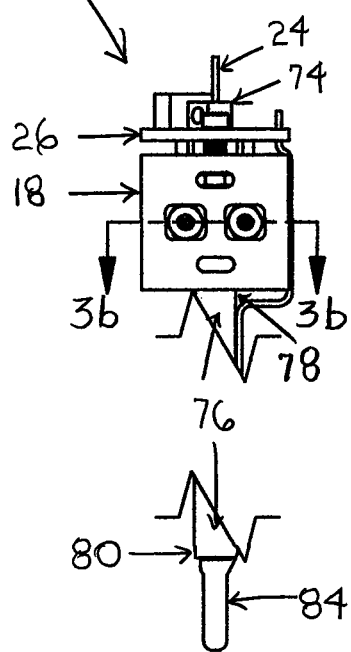
Figure 3C:
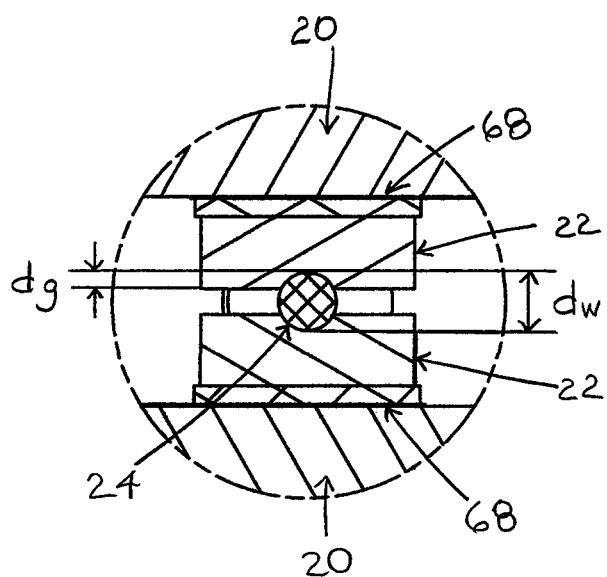
Figure 4B:
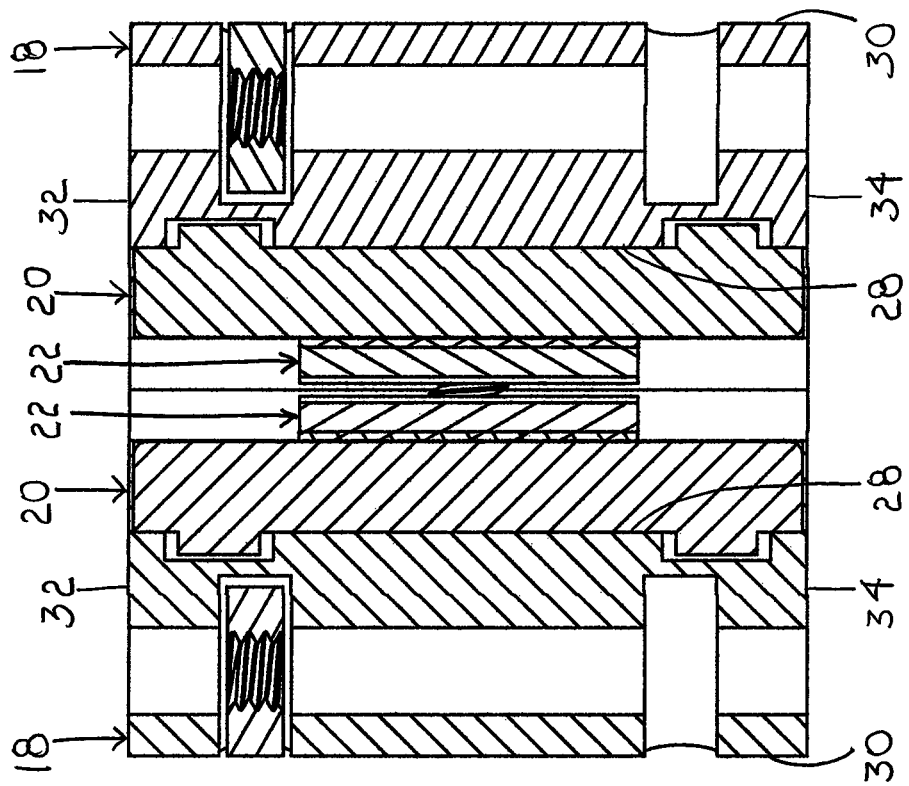
FIGS. 4a-4c are views of components of the sensor assembly of the magnetostrictive transmitter of FIGS. 1a-1c, including a holder, a substrate, a conductive strip, a conductive adhesive, a piezoelectric crystal, and a conductive plating
Figure 4A:
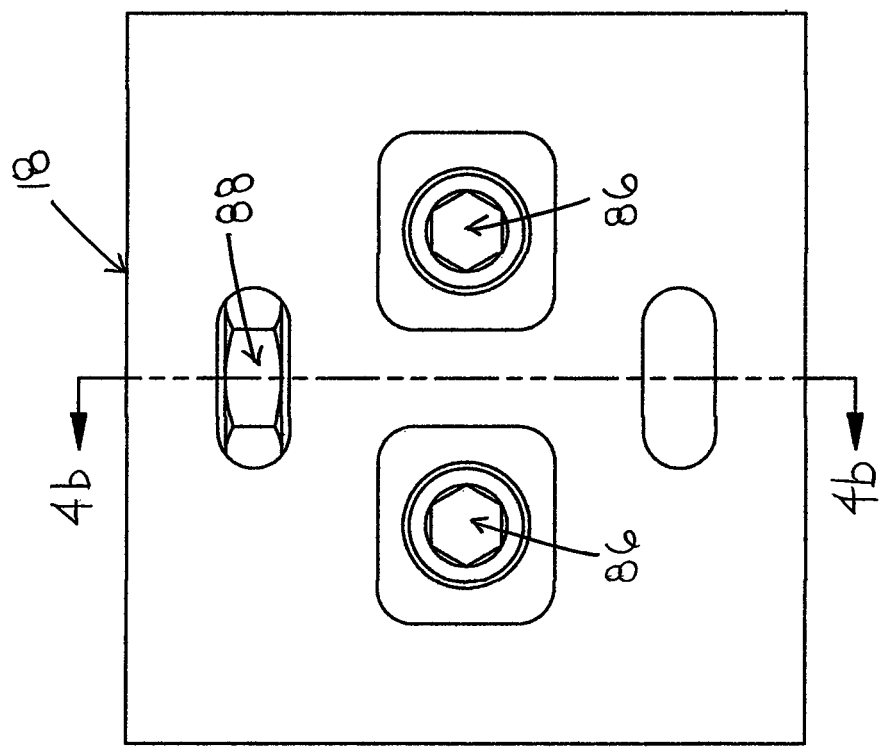
Figure 4C:
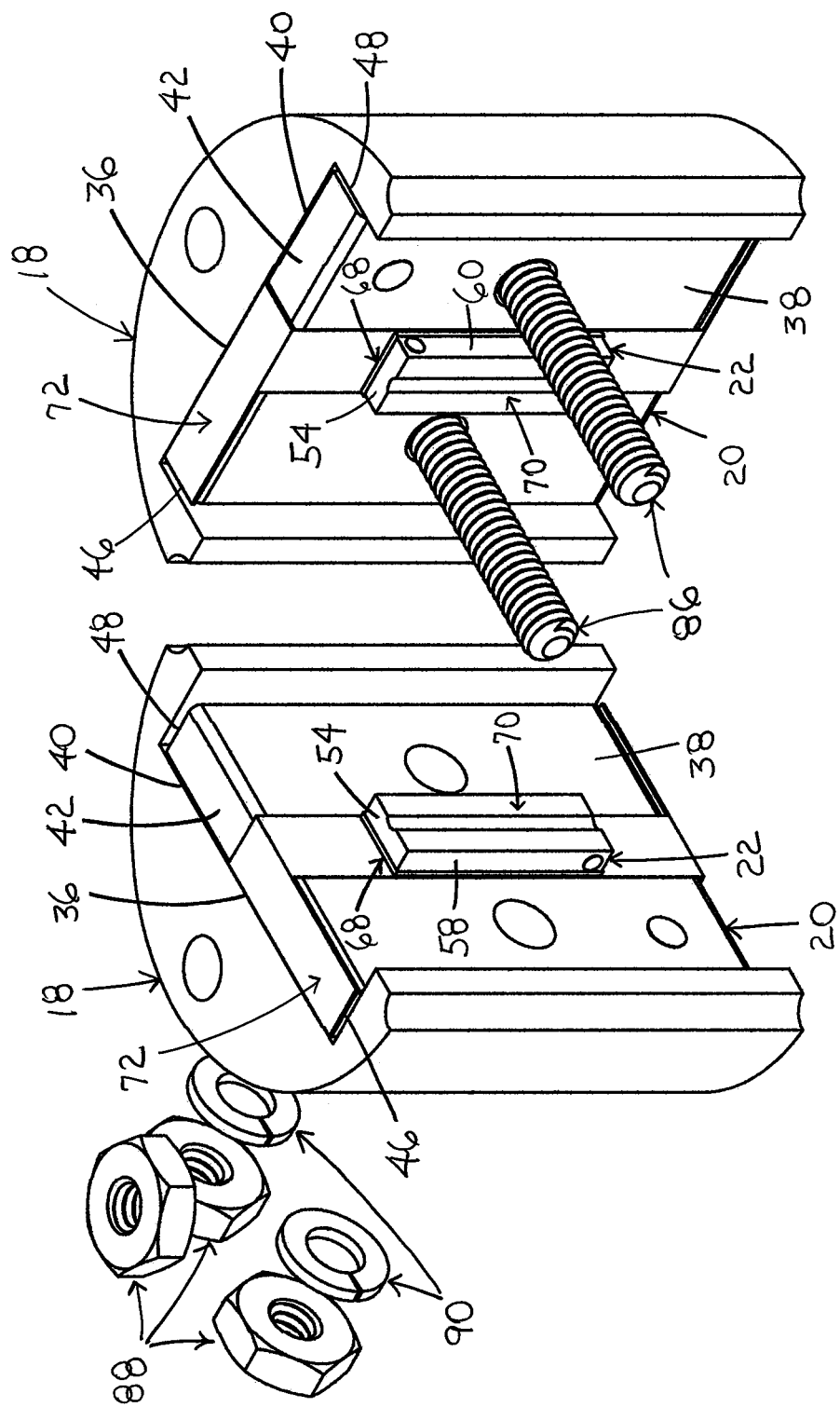

The present invention provides a magnetostrictive transmitter with a piezoelectric crystal including a groove for receiving a magnetostrictive wire. Magnetostrictive transmitters are used in connection with magnetic liquid level indication products to sense the level of liquid in vessels or gages.

An exemplary embodiment of a magnetostrictive transmitter 10 of the present invention is illustrated in FIGS. 1a-7b. In the exemplary embodiment, the magnetostrictive transmitter 10 includes an electronics housing 12, an electronics module (not shown), a sensor housing 14, and a sensor assembly 16. The electronics module is housed in the electronics housing 12. The sensor assembly 16 is housed in the sensor housing 14. The sensor housing 14 is attached to the electronics housing 12. Most of these components of magnetostrictive transmitters are well-known in the art and will not be described in greater detail. Only the sensor assembly 16 will be described in greater detail.

An exemplary embodiment of the sensor assembly 16 is shown in detail in FIGS. 1b-6c. In an exemplary embodiment, the sensor assembly 16 includes a holder 18, a substrate 20, a piezoelectric crystal 22, a magnetostrictive wire 24, and a PCB 26. In the illustrated embodiment, the sensor assembly 16 includes a pair of holders 18, a pair of substrates 20, a pair of piezoelectric crystals 22, the magnetostrictive wire 24, and the PCB 26.

An exemplary embodiment of the holder 18 is shown in detail in FIGS. 1b-1c, 2, 3a-3b, and 4a-4c. In an exemplary embodiment, the holder 18 is formed from a non-conductive material. In an exemplary embodiment, the holder 18 includes an inner surface 28 and an outer surface 30. In an exemplary embodiment, the inner surface 28 of the holder 18 is generally planar, and the outer surface 30 of the holder 18 is generally curved. In an exemplary embodiment, the holder 18 further includes an upper surface 32 and a lower surface 34. In the illustrated embodiment, the holder 18 is generally half cylinder shaped. In the illustrated embodiment, the holder 18 further includes a recess 36 extending in the inner surface 28. In the illustrated embodiment, the recess 36 is generally rectangular prism shaped. In an exemplary embodiment, the non-conductive material of the holder 18 is polyetheretherketone (PEEK). However, one of ordinary skill in the art will appreciate that other non-conductive materials could be used, such as other plastics and ceramics. Additionally, in the illustrated embodiment, the sensor assembly 16 includes two holders 18. However, one of ordinary skill in the art will appreciate that the sensor assembly 16 could include more or less than two holders 18 so long as the holder(s) 18 are operable to receive the substrate(s) 20 as described in greater detail below.

An exemplary embodiment of the substrate 20 is shown in detail in FIGS. 1b-1c, 3a-3c, 4b-4c, and 5a-5b. In an exemplary embodiment, the substrate 20 is formed from a non-conductive material. In an exemplary embodiment, the substrate 20 includes an inner surface 38 and an outer surface 40. In an exemplary embodiment, the inner surface 38 of the substrate 20 is generally planar, and the outer surface 40 of the substrate 20 is generally planar. In an exemplary embodiment, the substrate 20 further includes an upper surface 42 and a lower surface 44. In an exemplary embodiment, the substrate 20 further includes a first side surface 46 and a second side surface 48. In the illustrated embodiment, the substrate 20 is generally rectangular prism shaped. In an exemplary embodiment, the substrate 20 is operable to be received in the holder 18 with the outer surface 40 of the substrate 20 opposing the inner surface 28 of the holder 18. In the illustrated embodiment, each substrate 20 is operable to be received in one holder 18 with the outer surface 40 of the substrate 20 opposing the inner surface 28 of the holder 18 and with the inner surface 38 of one substrate 20 opposing the inner surface 38 of the other substrate 20. In the illustrated embodiment, the substrate 20 is operable to be received in the recess 36 in the holder 18 with the outer surface 40 of the substrate 20 opposing the inner surface 28 of the holder 18. In an exemplary embodiment, the substrate 20 has a height $h_s$, a width $w_s$, and a depth $d_s$ (see FIG. 5b). In an exemplary embodiment, the non-conductive material of the substrate 20 is a ceramic. However, one of ordinary skill in the art will appreciate that other non-conductive materials could be used, such as plastics and glass.

An exemplary embodiment of the piezoelectric crystal 22 is shown in detail in FIGS. 1b-1c, 3a-3c, 4b-4c, 5a-5b, and 6b-6c. In an exemplary embodiment, the piezoelectric crystal 22 is formed from a piezoelectric material. In an exemplary embodiment, the piezoelectric crystal 22 includes an inner surface 50 and an outer surface 52. In an exemplary embodiment, the inner surface 50 of the piezoelectric crystal 22 is generally planar, and the outer surface 52 of the piezoelectric crystal 22 is generally planar. In an exemplary embodiment, the piezoelectric crystal 22 further includes an upper surface 54 and a lower surface 56. In an exemplary embodiment, the piezoelectric crystal 22 further includes a first side surface 58 and a second side surface 60. In the illustrated embodiment, the piezoelectric crystal 22 is generally rectangular prism shaped. In an exemplary embodiment, the piezoelectric crystal 22 further includes a groove 62 extending in the inner surface 50 from the upper surface 54 through the lower surface 56. In the illustrated embodiment, the groove 62 extends generally equidistantly between the first side surface 58 and the second side surface 60. In the illustrated embodiment, the groove 62 has a generally rounded shape. In an exemplary embodiment, the groove 62 has a depth $d_g$ (see FIG. 3c).

In an exemplary embodiment, the piezoelectric crystal 22 is operable to be mounted to the substrate 20 with the outer surface 52 of the piezoelectric crystal 22 opposing the inner surface 38 of the substrate 20. In the illustrated embodiment, each piezoelectric crystal 22 is operable to be mounted to one substrate 20 with the outer surface 52 of the piezoelectric crystal 22 opposing the inner surface 38 of the substrate 20 and with the inner surface 50 of one piezoelectric crystal 22 opposing the inner surface 50 of the other piezoelectric crystal 22.

In an exemplary embodiment, the inner surface 50 of one piezoelectric crystal 22 is generally parallel to the inner surface 50 of the other piezoelectric crystal 22. In an exemplary embodiment, the inner surface 50 of one piezoelectric crystal 22 does not contact the inner surface 50 of the other piezoelectric crystal 22. In an exemplary embodiment, the first side surface 58 and the second side surface 60 of one piezoelectric crystal 22 do not contact the first side surface 58 or the second side surface 60 of the other piezoelectric crystal 22. In an exemplary embodiment, no surface of one piezoelectric crystal 22 contacts any surface of the other piezoelectric crystal 22.

In an exemplary embodiment, the piezoelectric crystal has a height $h_c$, a width $w_c$, and a depth $d_c$ (see FIG. 5b). In an exemplary embodiment, the height $h_s$, the width $w_s$, and the depth $d_s$ of the substrate 20 are greater than the height $h_c$, the width $w_c$, and the depth $d_c$ of the piezoelectric crystal 22, respectively. In an exemplary embodiment, the height $h_s$, the width $w_s$, and the depth $d_s$ of the substrate 20 are substantially greater than the height $h_c$, the width $w_c$, and the depth $d_c$ of the piezoelectric crystal 22, respectively.

An exemplary embodiment of the magnetostrictive wire 24 is shown in detail in FIGS. 1b-1c, 2, and 3a-3c. In an exemplary embodiment, the magnetostrictive wire 24 is formed from a magnetostrictive material. In an exemplary embodiment, the magnetostrictive wire 24 includes an upper end 64 and a lower end 66. In an exemplary embodiment, the upper end 64 of the magnetostrictive wire 24 is operable to be connected to another component of the sensor assembly 16 (as will be described in greater detail below). In an exemplary embodiment, the lower end 66 of the magnetostrictive wire 24 is operable to extend in the sensor housing 14. In an exemplary embodiment, the magnetostrictive wire 24 has a diameter $d_w$ (see FIG. 3c). In an exemplary embodiment, the depth $d_g$ of the groove 62 in the inner surface 50 of the piezoelectric crystal 22 is less than half of the diameter $d_w$ of the magnetostrictive wire 24.

In an exemplary embodiment, a portion of the magnetostrictive wire 24 is operable to be received in the groove 62 in the inner surface 50 of the piezoelectric crystal 22. In an exemplary embodiment, a portion of the magnetostrictive wire 24 is operable to be in contact with at least a portion of the groove 62 in the inner surface 50 of the piezoelectric crystal 22. In the illustrated embodiment, a portion of the magnetostrictive wire 24 is operable to be in contact with the entire groove 62 in the inner surface 50 of the piezoelectric crystal 22. In an exemplary embodiment, a portion of the magnetostrictive wire 24 is operable to be compressed in the groove 62 in the inner surface 50 of the piezoelectric crystal 22.

An exemplary embodiment of the PCB 26 is shown in detail in FIGS. 1b-1c, 2, and 3a. PCBs for magnetostrictive transmitters are well-known in the art and will not be described in detail.

In an exemplary embodiment, the sensor assembly 16 further includes a conductive adhesive 68. An exemplary embodiment of the conductive adhesive 68 is shown in detail in FIGS. 3b-3c, 4c, and 5a-5b. In an exemplary embodiment, the conductive adhesive 68 is operable to mount the piezoelectric crystal 22 to the substrate 20.

Figure 6C:
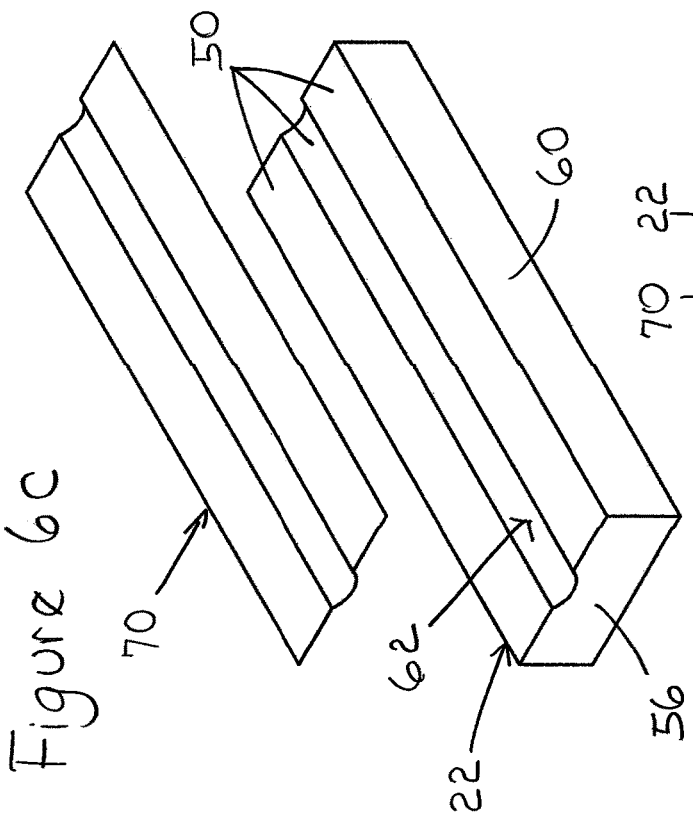
FIGS. 6a-6c are views of components of the sensor assembly of the magnetostrictive transmitter of FIGS. 1a-1c, including the piezoelectric crystal and the conductive plating
Figure 6B:
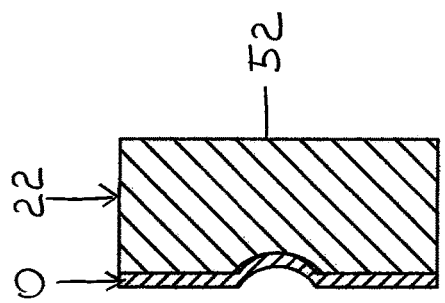
Figure 6A:
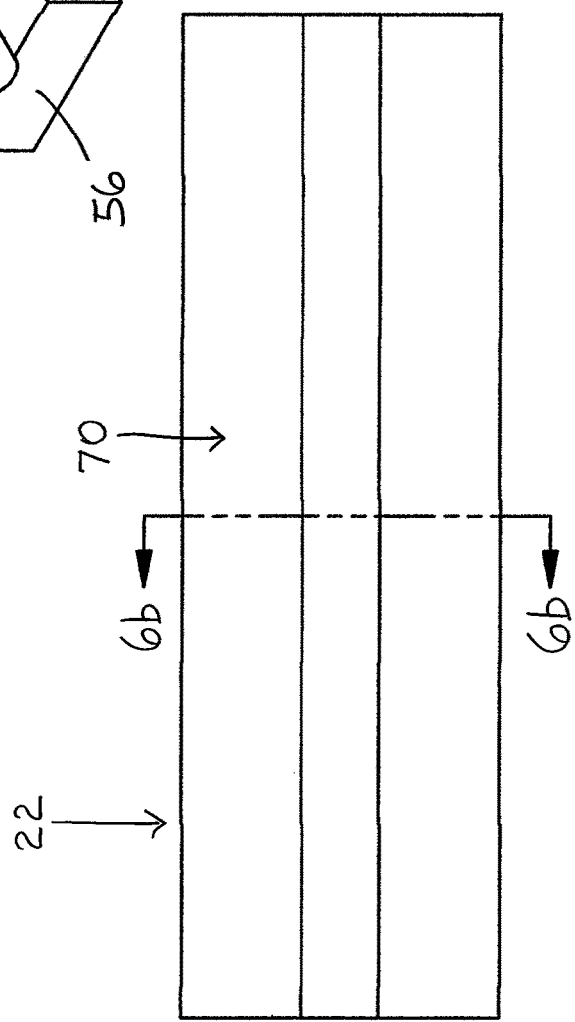
Figure 7B:
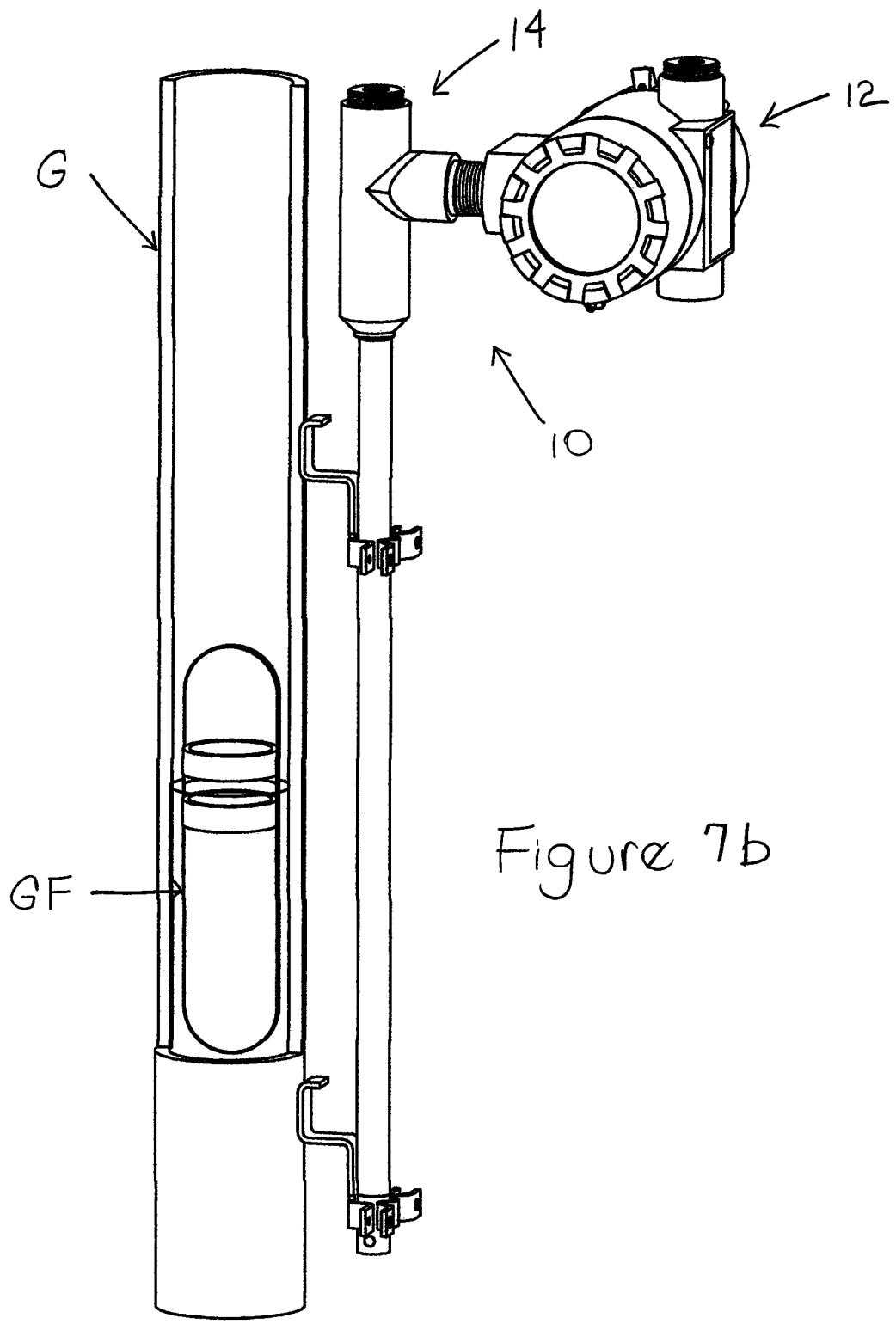

In an exemplary embodiment, the sensor assembly 16 further includes a conductive plating 70. An exemplary embodiment of the conductive plating 70 is shown in detail in FIGS. 4c, 5a-5b, and 6a-6c. The conductive plating 70 is shown in other Figures (i.e., FIGS. 1b-1c, 3b-3c, and 4b). However, due to a thickness of the conductive plating 70 and a scale of the Figures, the conductive plating 70 is not visible in these Figures. In FIG. 6b, the thickness of the conductive plating 70 is exaggerated for illustration purposes. In an exemplary embodiment, the conductive plating 70 is formed from a metal. In an exemplary embodiment, the conductive plating 70 is operable to extend on at least a portion of the inner surface 50 of the piezoelectric crystal 22. In the illustrated embodiment, the conductive plating 70 is operable to extend on the entire inner surface 50 of the piezoelectric crystal 22. In an exemplary embodiment, the metal of the conductive plating 70 is gold. However, one of ordinary skill in the art will appreciate that other conductive metals could be used, such as nickel. Additionally, one of ordinary skill in the art will appreciate that the sensor assembly 16 may not include any conductive plating 70.

In an exemplary embodiment, the sensor assembly 16 further includes a conductive strip 72. An exemplary embodiment of the conductive strip 72 is shown in detail in FIGS. 4b-4c and 5a-5b. In an exemplary embodiment, the conductive strip 72 is formed from a metal. One of ordinary skill in the art will appreciate that the conductive strip 72 can be formed from any conductive metal. In an exemplary embodiment, the conductive strip 72 is operable to extend on at least a portion of the inner surface 38 of the substrate 20 and on at least a portion of the upper surface 42 of the substrate 20. In an exemplary embodiment, the conductive strip 72 is operable to extend on at least a portion of the inner surface 38 of the substrate 20, on at least a portion of the upper surface 42 of the substrate 20, and on at least a portion of the lower surface 44 of the substrate 20.

In an exemplary embodiment, the conductive strip 72 is operable to extend on at least a portion of the inner surface 38 of the substrate 20 between the inner surface 38 of the substrate 20 and the outer surface 52 of the piezoelectric crystal 22. In an exemplary embodiment, the conductive strip 72 is operable to extend on the inner surface 38 of the substrate 20 from the upper surface 42 of the substrate 20 to at least a portion of the inner surface 38 of the substrate 20 that opposes the outer surface 52 of the piezoelectric crystal 22. In the illustrated embodiment, the conductive strip 72 is operable to extend on the inner surface 38 of the substrate 20 from the upper surface 42 of the substrate 20 through at least a portion of the inner surface 38 of the substrate 20 that opposes the outer surface 52 of the piezoelectric crystal 22 to the lower surface 44 of the substrate 20.

In an exemplary embodiment, the conductive strip 72 is operable to extend on the upper surface 42 of the substrate 20 from the conductive strip 72 on the inner surface 38 of the substrate 20 to one of the first side surface 46 and the second side surface 48 of the substrate 20. In an exemplary embodiment, the conductive strip 72 is operable to extend on the lower surface 44 of the substrate 20 from the conductive strip 72 on the inner surface 38 of the substrate 20 to one of the first side surface 46 and the second side surface 48 of the substrate 20.

In an exemplary embodiment, the sensor assembly 16 further includes a connector 74. An exemplary embodiment of the connector 74 is shown in detail in FIGS. 1b-1c, 2, and 3a. In an exemplary embodiment, the connector 74 is operable to connect the magnetostrictive wire 24 to another component of the sensor assembly 16. In the illustrated embodiment, the connector 74 is operable to connect the magnetostrictive wire 24 to the PCB 26. In the illustrated embodiment, the connector 74 is a binding post. However, one of ordinary skill in the art will appreciate that the magnetostrictive wire 24 could be connected to the sensor assembly 16 using other mechanisms and could be connected to other components of the sensor assembly 16. In an exemplary embodiment, the magnetostrictive wire 24 is connected to another component of the sensor assembly 16 at or above the piezoelectric crystal 22.

In an exemplary embodiment, the sensor assembly 16 further includes an insulator 76. An exemplary embodiment of the insulator 76 is shown in detail in FIGS. 1b-1c, 2, and 3a. In an exemplary embodiment, the insulator 76 is formed from a non-conductive material. In an exemplary embodiment, the insulator 76 includes an upper end 78 and a lower end 80. In an exemplary embodiment, the insulator 76 includes a longitudinal opening 82 extending from the upper end 78 through the lower end 80. In the illustrated embodiment, the insulator 76 is generally cylindrical shaped. In an exemplary embodiment, the insulator 76 is operable to receive a portion of the magnetostrictive wire 24 in the longitudinal opening 82. In the illustrated embodiment, the lower end 80 of the insulator 76 is enclosed with a nut 84, such as a barrel nut.

The sensor assembly 16 can be assembled. In an exemplary embodiment, once assembled, some components of the sensor assembly 16 are secured using fasteners. In an exemplary embodiment, the fasteners are bolts 86, nuts 88, and washers 90. However, one of ordinary skill in the art will appreciate that other fasteners could be used. The assembly of sensor assemblies in magnetostrictive transmitters is well-known in the art and will not be described in greater detail.

The magnetostrictive transmitter 10 can be installed in a process. In an exemplary embodiment, the magnetostrictive transmitter 10 is connected to a vessel, such as a drum or a tank. An exemplary embodiment of the magnetostrictive transmitter 10 connected to a vessel V is shown in detail in FIG. 7a. In an exemplary embodiment, the vessel V includes a vessel float VF with magnets inside the vessel V. In another exemplary embodiment, the magnetostrictive transmitter 10 is connected to a gage, such as a liquid level gage. An exemplary embodiment of the magnetostrictive transmitter 10 connected to a gage G is shown in detail in FIG. 7b. In an exemplary embodiment, the gage G includes a gage float GF with magnets inside the gage G. The installation of magnetostrictive transmitters in vessels and gages is well-known in the art and will not be described in greater detail.

During operation of the magnetostrictive transmitter 10, an electrical pulse is applied to the magnetostrictive wire 24. When the electrical pulse reaches the vessel float VF with the magnets inside the vessel V or the gage float GF with the magnets inside the gage G, a magnetic field generated by the electrical pulse will interact with a magnetic field generated by the magnets in the vessel float VF or the gage float GF and cause the magnetostrictive wire 24 to twist. The twist of the magnetostrictive wire 24 applies a mechanical stress to the piezoelectric crystals 22. The mechanical stress applied to the piezoelectric crystals 22 generates an electrical signal that is transmitted to the PCB 26 (through the conductive adhesives 68 and the conductive strips 72 on the substrates 20). Based on the time it takes from the electrical pulse being applied to the magnetostrictive wire 24 and the PCB 26 receiving the electrical signal, the level of the vessel float VF or the gage float GF and thus the level of the fluid in the vessel V or the gage G can be determined.

As used herein, when the magnetostrictive wire 24 is referred to as in contact with the groove 62 in the inner surface 50 of the piezoelectric crystal 22, the magnetostrictive wire 24 may be in physical contact with the groove 62 or with a plating or other coating in the groove 62, such as the conductive plating 70.

Additionally, as used herein, when a surface of one component opposes a surface of another component, the surfaces may be in physical contact with one another or there may be a gap between the surfaces. Moreover, the surfaces may have an additional component between them. For example, the outer surface 52 of the piezoelectric crystal 22 has been described as opposing the inner surface 38 of the substrate 20 even though the conductive adhesive 68 and the conductive strip 72 are between these surfaces.

One of ordinary skill in the art will now appreciate that the present invention provides a magnetostrictive transmitter with a piezoelectric crystal including a groove for receiving a magnetostrictive wire. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A sensor assembly for a magnetostrictive transmitter, comprising:
   a holder, the holder being formed from a non-conductive material, the holder including an inner surface and an outer surface, the holder further including an upper surface and a lower surface;
   a substrate, the substrate being formed from a non-conductive material, the substrate including an inner surface and an outer surface, the substrate further including an upper surface and a lower surface, the substrate operable to be received in the holder with the outer surface of the substrate opposing the inner surface of the holder;
   a piezoelectric crystal, the piezoelectric crystal including an inner surface and an outer surface, the piezoelectric crystal further including an upper surface and a lower surface, the piezoelectric crystal further including a groove extending in the inner surface from the upper surface through the lower surface, the piezoelectric crystal operable to be mounted to the substrate with the outer surface of the piezoelectric crystal opposing the inner surface of the substrate; and
   a magnetostrictive wire, the magnetostrictive wire including an upper end and a lower end, a portion of the magnetostrictive wire operable to be received in the groove in the inner surface of the piezoelectric crystal.

2. The sensor assembly for a magnetostrictive transmitter of claim 1, wherein the inner surface of the holder is generally planar, and the outer surface of the substrate is generally planar.

3. The sensor assembly for a magnetostrictive transmitter of claim 1, wherein the inner surface of the substrate is generally planar, and the outer surface of the piezoelectric crystal is generally planar.

4. The sensor assembly for a magnetostrictive transmitter of claim 1, wherein the inner surface of the piezoelectric crystal is generally planar.

5. The sensor assembly for a magnetostrictive transmitter of claim 1, further including a conductive adhesive operable to mount the piezoelectric crystal to the substrate.

6. The sensor assembly for a magnetostrictive transmitter of claim 1, further including a conductive plating on at least a portion of the inner surface of the piezoelectric crystal.

7. The sensor assembly for a magnetostrictive transmitter of claim 6, wherein the conductive plating is formed from gold.

8. The sensor assembly for a magnetostrictive transmitter of claim 1, further including a conductive strip operable to extend on at least a portion of the inner surface of the substrate between the inner surface of the substrate and the outer surface of the piezoelectric crystal and on at least a portion of the upper surface of the substrate.

9. A sensor assembly for a magnetostrictive transmitter, comprising:
a holder, the holder being formed from a non-conductive material, the holder including an inner surface and an outer surface, the holder further including an upper surface and a lower surface;
a pair of substrates, each substrate being formed from a non-conductive material, each substrate including an inner surface and an outer surface, each substrate further including an upper surface and a lower surface, each substrate operable to be received in the holder with the outer surface of each substrate opposing the inner surface of the holder and with the inner surface of one substrate opposing the inner surface of the other substrate;
a pair of piezoelectric crystals, each piezoelectric crystal including an inner surface and an outer surface, each piezoelectric crystal further including an upper surface and a lower surface, each piezoelectric crystal further including a groove extending in the inner surface from the upper surface through the lower surface, each piezoelectric crystal operable to be mounted to one substrate with the outer surface of each piezoelectric crystal opposing the inner surface of one substrate and with the inner surface of one piezoelectric crystal opposing the inner surface of the other piezoelectric crystal; and
a magnetostrictive wire, the magnetostrictive wire including an upper end and a lower end, a portion of the magnetostrictive wire operable to be received in the groove in the inner surface of each piezoelectric crystal.

10. The sensor assembly for a magnetostrictive transmitter of claim 9, wherein the inner surface of one piezoelectric crystal is generally parallel to the inner surface of the other piezoelectric crystal.

11. The sensor assembly for a magnetostrictive transmitter of claim 9, wherein the inner surface of one piezoelectric crystal does not contact any portion of the inner surface of the other piezoelectric crystal.

12. The sensor assembly for a magnetostrictive transmitter of claim 9, wherein each piezoelectric crystal further includes a first side surface and a second side surface, and the first side surface and the second side surface of one piezoelectric crystal do not contact the first side surface or the second side surface of the other piezoelectric crystal.

13. The sensor assembly for a magnetostrictive transmitter of claim 9, wherein no surface of one piezoelectric crystal contacts any surface of the other piezoelectric crystal.

14. The sensor assembly for a magnetostrictive transmitter of claim 9, further including a pair of conductive adhesives, each conductive adhesive operable to mount one piezoelectric crystal to one substrate.

15. The sensor assembly for a magnetostrictive transmitter of claim 9, further including a conductive plating on at least a portion of the inner surface of each piezoelectric crystal.

16. The sensor assembly for a magnetostrictive transmitter of claim 15, wherein each conductive plating is formed from gold.

17. The sensor assembly for a magnetostrictive transmitter of claim 9, further including a pair of conductive strips, each conductive strip operable to extend on at least a portion of the inner surface of one substrate between the inner surface of the one substrate and the outer surface of the opposing piezoelectric crystal and on at least a portion of the upper surface of the one substrate.

18. A sensor assembly for a magnetostrictive transmitter, comprising:
a holder, the holder being formed from a non-conductive material, the holder including an inner surface and an outer surface, the holder further including an upper surface and a lower surface;
a substrate, the substrate being formed from a non-conductive material, the substrate including an inner surface and an outer surface, the substrate further including an upper surface and a lower surface, the substrate operable to be received in the holder with the outer surface of the substrate opposing the inner surface of the holder;
a piezoelectric crystal, the piezoelectric crystal including an inner surface and an outer surface, the piezoelectric crystal further including an upper surface and a lower surface, the piezoelectric crystal further including a groove extending in the inner surface from the upper surface through the lower surface, the piezoelectric crystal operable to be mounted to the substrate with the outer surface of the piezoelectric crystal opposing the inner surface of the substrate; and
a magnetostrictive wire, the magnetostrictive wire including an upper end and a lower end, a portion of the magnetostrictive wire operable to be received in the groove in the inner surface of the piezoelectric crystal;
wherein the portion of the magnetostrictive wire is in contact with the groove in the inner surface of the piezoelectric crystal.

19. The sensor assembly for a magnetostrictive transmitter of claim 18, wherein the portion of the magnetostrictive wire is operable to be in contact with the entire groove in the inner surface of the piezoelectric crystal.

20. The sensor assembly for a magnetostrictive transmitter of claim 18, wherein the portion of the magnetostrictive wire is compressed in the groove in the inner surface of the piezoelectric crystal.

21. The sensor assembly for a magnetostrictive transmitter of claim 18, wherein:
the groove has a depth;
the magnetostrictive wire has a diameter; and
the depth of the groove in the inner surface of the piezoelectric crystal is less than half of the diameter of the magnetostrictive wire.

* * * * *